United States Patent
Wu et al.

(10) Patent No.: US 11,689,024 B2
(45) Date of Patent: Jun. 27, 2023

(54) BILATERAL STOCHASTIC POWER GRID DISPATCHING METHOD

(71) Applicant: Tsinghua University, Beijing (CN)

(72) Inventors: Wenchuan Wu, Beijing (CN); Shuwei Xu, Beijing (CN); Boming Zhang, Beijing (CN); Hongbin Sun, Beijing (CN); Bin Wang, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 26 days.

(21) Appl. No.: 17/383,658

(22) Filed: Jul. 23, 2021

(65) Prior Publication Data
US 2022/0302706 A1    Sep. 22, 2022

(30) Foreign Application Priority Data
Mar. 22, 2021    (CN) .......................... 202110301505.1

(51) Int. Cl.
*H02J 3/38* (2006.01)
*G05B 19/042* (2006.01)

(52) U.S. Cl.
CPC ............ *H02J 3/381* (2013.01); *G05B 19/042* (2013.01); *G05B 2219/2639* (2013.01); *H02J 2203/20* (2020.01); *H02J 2300/28* (2020.01)

(58) Field of Classification Search
CPC .... H02J 3/381; H02J 2203/20; H02J 2300/28; G05B 19/042; G05B 2219/2639; Y02E 10/56; Y02E 10/76; Y02E 60/00; Y04S 10/50; Y04S 40/20
See application file for complete search history.

(56) References Cited

PUBLICATIONS

Lubin, Miles, Daniel Bienstock, and Juan Pablo Vielma. "Two-sided linear chance constraints and extensions." arXiv preprint arXiv:1507.01995, [online], published in year 2016, [retrieved on Oct. 13, 2022], retrieved from https://arxiv.org/pdf/1507.01995.pdf (Year: 2016).*

* cited by examiner

*Primary Examiner* — Thomas C Lee
*Assistant Examiner* — Charles Cai
(74) *Attorney, Agent, or Firm* — Hodgson Russ LLP

(57) ABSTRACT

The disclosure relates to a two-side stochastic dispatching method for a power grid. By analyzing historical data of wind power, the Gaussian mixture distribution is fitted by software. For certain power system parameters, a two-side chance-constrained stochastic dispatching model is established. The hyperbolic tangent function is used to analyze and approximate cumulative distribution functions of random variables in the reserve demand constraint and the power flow constraint, to convert the two-side chance constraint into a deterministic constraint. The disclosure can have the advantage of using the hyperbolic tangent function to convert the two-side chance constraint containing risk levels and random variables into the solvable deterministic convex constraint, effectively improving the solution efficiency of the model, and providing decision makers with a more reasonable dispatching basis.

4 Claims, No Drawings

BILATERAL STOCHASTIC POWER GRID DISPATCHING METHOD

CROSS-REFERENCE TO RELATED APPLICATION

This application claims priority to Chinese Patent Application No. 202110301505.1, filed Mar. 22, 2021, the entire disclosure of which is incorporated herein by reference.

TECHNICAL FIELD

The disclosure relates to the field of operation technologies for power systems, and more particularly to a two-side stochastic dispatching method for a power grid.

BACKGROUND

It is major measures for energy development strategy to develop and utilize renewable energy and to realize sustainable energy development. With the large-scale integration of renewable energy such as wind power and photovoltaic power into the power grid, volatility and randomness of the renewable energy have brought two problems to active power rolling dispatch of the power system.

On the one hand, accurate and flexible wind power forecasting is the basis for realizing safe and economical active power rolling dispatch. The conventional forecasting methods include an interval description method of given upper and lower power limits and a description method of simple Gaussian probability density function. Although models such as Beta distribution and general distribution are also used in the fitting of the predicted power of renewable energy, these models either may not accurately fit the predicted power of wind power, or bring great difficulties to the solution of the active power rolling dispatch model. Therefore, an accurate and flexible forecasting model may be in urgent need of application.

On the other hand, the volatility and randomness of renewable energy make it difficult to apply the conventional deterministic or robust dispatching methods. Single-side chance-constrained dispatching may take into account the system operation risk and the power generation cost, but the independent modeling of the upper and lower bound constrain of the reserve capacity (branch capacity) results in the optimization result being too slack and unable to meet the preset safety level. Two-side chance-constrained stochastic dispatching may overcome the disadvantages of the unilateral model and obtain the lowest-cost dispatching strategy by minimizing the objective function value. The solution of two-side chance-constrained stochastic dispatching is extremely difficult. The conventional sampling solution method has a large amount of calculation and poor convergence. The slack solution method makes the solution result not accurate enough to achieve the high efficiency of dispatching.

In summary, the modeling and rapid solution of two-side chance-constrained dispatching taking into account the randomness of renewable energy power is still a major problem affecting the utilization of renewable energy.

SUMMARY

The disclosure aims to provide a two-side stochastic dispatching method for a power grid. A two-side chance constraint is transformed into a deterministic convex constraint and the deterministic convex constraint is solved effectively based on a Gaussian mixture distribution being accurately approximated by a hyperbolic tangent function, thus making full use of advantages of chance-constrained stochastic dispatching, effectively reducing system risks and saving power grid dispatching cost.

The two-side stochastic dispatching method for the power grid, provided in the disclosure, includes the following steps:

(1) establishing a two-side stochastic dispatching model based on hyperbolic tangent function approximation, in which the two-side stochastic dispatching model includes an objective function and constraints;

(2) analyzing and approximating a Gaussian mixture distribution satisfied by a random variable, appearing in the constraints, based on a reserve demand constraint and a power flow constraint in step (1), to obtain an approximate expression of the random variable; (3) transforming the two-side stochastic dispatching model in step (1) into a deterministic optimization model based on the approximation of the random variable in the reserve demand constraint and the power flow constraint in step (2); and (4) using an interior point method to solve the deterministic optimization model transformed in steps (1) to (3), to obtain a power generation plan of thermal power units and renewable energy power stations.

The characteristics and advantages of the two-side stochastic dispatching method based on hyperbolic tangent function approximation, provided in the disclosure, may be as follows.

The method of the disclosure first accurately depicts characteristics and correlation of the predicted power of renewable energy such as wind power/photovoltaic power through the Gaussian mixture distribution of multiple random variables. Based on the distribution, the method establishes the cost-minimized stochastic dispatching model considering deterministic constraints and two-side chance constraints. The two-side chance constraints limit the uncertainty of the reserve demand (branch flow), caused by the randomness of the power of renewable energy power stations such as wind power/photovoltaic power stations during the dispatching process, to be within the upper limit and lower limit of safety by a certain level of confidence. At the same time, the hyperbolic tangent function is used to analyze and approximate the cumulative distribution function of the random variable in the chance constraint, so as to convert the two-side chance constraint into the deterministic convex constraint. The stochastic dispatching model is effectively solved. The result of model optimization is the optimal dispatching decision of conventional thermal power units and renewable energy power stations such as wind power/photovoltaic power under the control of dispatching risk and the reduction of dispatching cost. The advantage of the disclosure is transforming the two-side chance constraint into the deterministic convex constraint through the analytical approximation of the cumulative distribution function of the random variable, which effectively improves the solution efficiency of the model. Also, the two-side chance-constrained model with the adjustable risk level eliminates the conservative nature of conventional robust dispatching, which provides decision-makers with a more reasonable dispatching basis. The method of the disclosure may be applied to the dispatching of the power system including large-scale renewable energy grid connection.

DETAILED DESCRIPTION

The two-side stochastic dispatching method based on hyperbolic tangent function approximation, provided in the disclosure, includes the following steps:

The two-side stochastic dispatching method for the power grid, provided in the disclosure, includes the following steps:

(1) establishing a two-side stochastic dispatching model based on hyperbolic tangent function approximation, in which the two-side stochastic dispatching model includes an objective function and constraints;

(2) analyzing and approximating a Gaussian mixture distribution satisfied by a random variable, appearing in the constraints, based on a reserve demand constraint and a power flow constraint in step (1), to obtain an approximate expression of the random variable; (3) transforming the two-side stochastic dispatching model in step (1) into a deterministic optimization model based on the approximation of the random variable in the reserve demand constraint and the power flow constraint in step (2); and (4) using an interior point method to solve the deterministic optimization model transformed in steps (1) to (3), to obtain a power generation plan of thermal power units and renewable energy power stations.

In the above two-side stochastic dispatching method for the power grid, step (1) includes:

(1) establishing the objective function of the two-side stochastic dispatching model, including:

minimizing a sum of power generation cost, positive spinning reserve capacity cost and negative spinning reserve capacity cost, of the thermal power units, which is expressed by a formula of:

$$\min \sum_{t=1}^{T} \sum_{i=1}^{N_G} CF_i(P_i^t) + \sum_{t=1}^{T} \sum_{i=1}^{N_G} \left( c_{up} r_{i,t}^{up} + c_{dn} r_{i,t}^{dn} \right) \quad (25)$$

where, T represents a number of dispatching periods, $N_G$ represents a number of the thermal power units, t represents a serial number of the dispatching period, i represents a serial number of the thermal power unit, $c_{up}$ represents a positive spinning reserve capacity cost per unit, $c_{dn}$ represents a negative spinning reserve capacity cost per unit, $r_{i,t}^{up}$ represents a positive spinning reserve capacity reserved by an $i^{th}$ thermal power unit during a dispatching period t, $r_{i,t}^{dn}$ represents a negative spinning reserve capacity reserved by the $i^{th}$ thermal power unit during the dispatching period t, $P_i^t$ represents a planned power of the $i^{th}$ thermal power unit during the dispatching period t, $CF_i$ represents a fuel cost function of the $i^{th}$ thermal power unit, the fuel cost function of the thermal power unit is expressed as a quadratic function of the power $P_i^t$ of the thermal power unit by a formula of:

$$CF_i(P_i^t) = a_i(P_i^t)^2 + b_i P_i^t + c_i \quad (26)$$

where, $a_i$ represents a quadratic coefficient of a fuel cost of the $i^{th}$ thermal power unit, $b_i$ represents a primary coefficient of the fuel cost of the $i^{th}$ thermal power unit, $c_i$ represents a constant coefficient of the fuel cost of the $i^{th}$ thermal power unit, (2) the constraints of the two-side stochastic dispatching model, include:

(2-1) a power balance constraint of the power grid, which is expressed by a formula of:

$$\sum_{i=1}^{N_G} P_i^t + \sum_{j=1}^{N_W} w_j^t = \sum_{k=1}^{N_D} d_k^t \quad (27)$$

where, $w_j^t$ represents a planned reference power of a $j^{th}$ renewable energy power station during the dispatching period t, $d_k^t$ represents a size of a $k^{th}$ load during the dispatching period t, $N_w$ represents a number of the power stations, and $N_D$ represents a number of loads;

(2-2) an upper limit constraint and a lower limit constraint of the power $P_i^t$ of the thermal power unit in the power grid, which is expressed by a formula of:

$$\underline{P}_i \leq P_i^t \leq \overline{P}_i \quad (28)$$

where, $\underline{P}_i$ represents an upper bound of the power of the $i^{th}$ thermal power unit, and $\overline{P}_i$ represents a lower bound of the power of the $i^{th}$ thermal power unit;

(2-3) an upper limit constraint and a lower limit constraint of the planned power $w_j^t$ of the power station of the power grid, which is expressed by a formula of:

$$0 \leq w_j^t \leq \overline{w}_j^t \quad (29)$$

where, $\overline{w}_j^t$ represents an upper bound of an allowable power of the $j^{th}$ renewable energy power station during the dispatching period t;

(2-4) ramp constraints of the thermal power unit in the power grid, which are expressed by formulas of:

$$P_i^t - P_i^{t-1} \geq -RD_i \Delta T \quad (30) \text{ and}$$

$$P_i^t - P_i^{t-1} \leq RU_i \Delta T \quad (31)$$

where, $RU_i$ represents an upward ramp rate of the $i^{th}$ thermal power unit, $RD_i$ represents a downward ramp rate of the $i^{th}$ thermal power unit, $\Delta T$ represents a dispatching interval between two adjacent dispatching periods;

(2-5) a maximum reserve capacity constraint that the thermal power unit in the power grid provides, which is expressed by formulas of:

$$r_{i,t}^{up} \leq \min\{\overline{P}_i - P_i^t, RU_i \Delta T\} \quad (32) \text{ and}$$

$$r_{i,t}^{dn} \leq \min\{P_i^t - \underline{P}_i, RD_i \Delta T\} \quad (33)$$

where, a mathematical symbol min {·} represents a minimum value of elements in a set;

(2-6) a reserve demand constraint in response to fluctuations in the renewable energy power stations in the power grid, which is expressed by a formula of:

$$Pr\left( -\sum_{i=1}^{N_G} r_{i,t}^{up} \leq \sum_{j=1}^{N_W} \tilde{w}_j^t - \sum_{j=1}^{N_W} w_j^t \leq \sum_{i=1}^{N_G} r_{i,t}^{dn} \right) \geq 1 - \beta \quad (34)$$

where, a mathematical symbol Pr{·} represents a probability of occurrence of an event, $\tilde{w}_j^t$ represents an actual power of the $j^{th}$ renewable energy power station during the dispatching period t, a superscript ~ represents that a variable is a random variable, β represents a maximum risk level preset by a dispatcher and a value range of the maximum risk level is 0 to 0.5, a joint probability distribution of the actual power of all renewable energy power stations meets a Gaussian mixture distribution of:

$$\tilde{w}^t = \{\tilde{w}_j^t \mid 1 \leq j \leq N_W\} \text{ and} \qquad (35)$$

$$PDF_{\tilde{w}^t}(Y) = \sum_{m=1}^{M} \omega_m N(Y, \mu_m, \Sigma_m), \omega_m \geq 0$$

$$N(Y \mid \mu_m, \Sigma_m) = \frac{1}{(2\pi)^{N_W/2} \det(\Sigma_m)^{1/2}} e^{-\frac{1}{2}(Y-\mu_m)^T \Sigma_m^{-1}(Y-\mu_m)} \qquad (36)$$

$\tilde{w}^t$ represents a planned power set of all renewable energy power stations during the dispatching period t, $\tilde{w}^t$ is a stochastic vector, $PDF_{\tilde{w}^t}(\cdot)$ represents a probability density function of the stochastic vector, Y represents a value of $\tilde{w}^t$, $N(Y, \mu_m, \Sigma_m)$ represents a $m^{th}$ component of the Gaussian mixture distribution, M represents a number of components of the Gaussian mixture distribution, $\omega_m$ represents a weight coefficient of the $m^{th}$ component of the Gaussian mixture distribution and satisfies that a sum of weight coefficients of all components is equal to 1, $\mu_m$ represents a mean vector of the $m^{th}$ component, $\Sigma_m$ represents a covariance matrix of the $m^{th}$ component, det represents a determinant of the matrix, and a superscript T represents a transpose of the matrix;

(2-7) a power flow constraint of the power grid, which is expressed by a formula of:

$$Pr\left(-L_l \leq \sum_{i=1}^{N_G} G_{l,i} \tilde{P}_i^t + \sum_{j=1}^{N_W} G_{l,j} \tilde{w}_j^t - \sum_{k=1}^{N_D} G_{l,k} d_k^t \leq L_l\right) \geq 1 - \eta, \qquad (37)$$

where, $G_{l,i}$ represents a transfer distribution factor of a $l^{th}$ branch for an active power of the $i^{th}$ thermal power unit, $G_{l,j}$ represents a transfer distribution factor of a $l^{th}$ branch for an active power of the $j^{th}$ renewable energy power station, $G_{l,k}$ represents a transfer distribution factor of the $l^{th}$ branch for the $k^{th}$ load, the above-mentioned transfer distribution factors are respectively obtained from a power grid dispatching center, $L_l$ represents an upper limit of active power on the $l^{th}$ branch, $\eta$ represents a risk level that the active power on the branch exceeds the upper limit of active power on the branch, which is set by the dispatcher, $\tilde{P}_i^t$ represents an actual power of the $i^{th}$ thermal power unit during the dispatching period t, which is expressed by a formula of:

$$\tilde{P}_i^t = P_i^t - \alpha_i \left(\sum_{j=1}^{N_W} \tilde{w}_j^t - \sum_{j=1}^{N_W} w_j^t\right) \qquad (38)$$

$$\sum_{i=1}^{N_G} \alpha_i = 1$$

where, $\alpha_i$ represents a power distribution coefficient of the $i^{th}$ thermal power unit, which is determined by a ratio of a rated capacity of the thermal power unit to a total capacity of all thermal power units participating in power generation;

in order to meet the power balance of the power grid at any dispatch time, a sum of power distribution coefficients of all thermal Dower units is equal to 1, $$\sum_{j=1}^{N_W} \tilde{w}_j^t - \sum_{j=1}^{N_W} w_j^t$$

represents a power difference between actual powers and planned powers of all renewable energy power stations;

substituting the formula (14) into the formula (13), in which the formula (13) is transformed into a formula of:

$$Pr\left(-L_l \leq \sum_{i=1}^{N_G} G_{l,i} P_i^t + \sum_{i=1}^{N_G} G_{l,i} \alpha_i \sum_{j=1}^{N_W} w_j^t + \sum_{j=1}^{N_W} \left(G_{l,j} - \sum_{i=1}^{N_G} G_{l,i} \alpha_i\right) \tilde{w}_j^t - \sum_{k=1}^{N_D} G_{l,k} d_k^t \leq L_l\right) \geq 1 - \eta. \qquad (39)$$

In the above two-side stochastic dispatching method for the power grid, step (2) includes:

(1) approximating the Gaussian mixture distribution by a formula of:

$$CDF_{\xi_0}(x) \approx \sum_{m_0}^{M_0} \frac{\omega_0}{2}\left(1 + \tanh\left(a \frac{x - \mu_{m_0}}{\sigma_{m_0}} + b\left(\frac{x - \mu_{m_0}}{\sigma_{m_0}}\right)^3\right)\right) \qquad (40)$$

$$a = 0.7983, b = 0.03564$$

$$\sum_{m_0}^{M_0} \omega_0 = 1$$

where, $\xi_0$ represents any one-dimensional random variable that obeys the Gaussian mixture distribution, $CDF_{\xi_0}$ represents a cumulative distribution function of the random variable, x represents an independent variable of the cumulative distribution function and represents a possible value of $\xi_0$, $M_0$ represents a number of Gaussian components obeyed by the random variable $\xi_0$, $m_0$ represents a $m_0^{th}$ component, $\omega_0$, $\mu_{m_0}$ and $\sigma_{m_0}$ represent a weight coefficient, an expectation and a standard deviation of the $m_0^{th}$ component, a and b represent constants, and tan h represent a hyperbolic tangent function in mathematical operations;

(2) based on the approximating method of the Gaussian mixture distribution in step (1), approximating a cumulative distribution function of a random variable in the reserve demand constraint in the formula (13) by a formula of:

$$CDF_{\xi_r^t}(y) \approx ACDF_{\xi_r^t}(y) = \sum_m^M \frac{\omega_m}{2}\left(1 + \tanh\left(a \frac{y - 1^T \mu_m}{1^T \Sigma_m 1} + b\left(\frac{y - 1^T \mu_m}{1^T \Sigma_m 1}\right)^3\right)\right) \qquad (41)$$

$$\xi_r^t = 1^T \tilde{w}_j^t,$$

where, $\xi_r^t$ represents a random variable and represents a sum of actual powers of all renewable energy power stations at time t, 1 represents a column vector with all elements being 1, $CDF_{\xi_r^t}(\cdot)$ represents a probability density function of the one-dimensional random variable $\xi_r^t$, y represents an independent variable of the cumulative distribution function $CDF_{\xi_r^t}(\cdot)$ and represents a possible value of $\xi_r^t$, and $ACDF_{\xi_r^t}(\cdot)$ represents an approximate expression of $CDF_{\xi_r^t}(\cdot)$; and (3) based on the approximating method of the Gaussian mixture distribution in step (1), approximating a cumulative distribution function of a random variable in the power flow constraint of the power grid in the formula (15) by a formula of:

$$CDF_{\xi_l^t}(z) \approx ACDF_{\xi_l^t}(z) = \sum_m^M \frac{\omega_m}{2}\left(1 + \tanh\left(a\frac{z - F_l^T \mu_m}{F_l^T \Sigma_m F_l} + b\left(\frac{z - F_l^T \mu_m}{F_l^T \Sigma_m F_l}\right)^3\right)\right) \quad (42)$$

$$\xi_l^t = F_l^T \tilde{w}_j^t$$

where, $F_l$ represents a column vector and a $j^{th}$ element of the vector is $$G_{l,j} - \sum_{i=1}^{N_G} G_{l,i}\alpha_i,$$

$\xi_l^t$ represents a random variable and represents a linear combination of actual powers of all renewable energy power stations at time t, coefficients of the linear combination is $F_l$, $CDF_{\xi_l^t}(\cdot)$ represents a probability density function of the one-dimensional random variable $\xi_l^t$, z represents an independent variable of the cumulative distribution function $CDF_{\xi_l^t}(\cdot)$ and represents a possible value of and $\xi_l^t$, and $ACDF_{\xi_l^t}(\cdot)$ represents an approximate expression of $CDF_{\xi_l^t}(\cdot)$.

In the above two-side stochastic dispatching method for the power grid, step (4) includes:

(1) transforming a chance constraint by using the approximate expression (17) of the cumulative distribution function based on the approximation of the random variable in the reserve demand constraint, as formulas of:

$$\sum_{i=1}^{N_G} r_{i,t}^{dn} + \sum_{j=1}^{N_W} w_j^t \geq q_{r,t}^{up} \quad (43)$$

$$-\sum_{i=1}^{N_G} r_{i,t}^{up} + \sum_{j=1}^{N_W} w_j^t \leq q_{r,t}^{dn} \quad (44)$$

$$ACDF_{\xi_r^t}(q_{r,t}^{up}) - ACDF_{\xi_r^t}(q_{r,t}^{dn}) \geq 1 - \beta \quad (45)$$

where, $q_{r,t}^{up}$ and $q_{r,t}^{dn}$ are auxiliary variables, which respectively represent a upper and lower quantiles of the reserve demand constraint at time t;

(2) transforming a power flow chance constraint determined in the formula (15) by using the approximate expression (18) of the cumulative distribution function of the random variable in the power flow constraint of the power grid based on the approximation of the random variable in the power flow constraint of the power grid, as formulas of:

$$L_l - \sum_{i=1}^{N_G} G_{l,i} P_i^t - \sum_{i=1}^{N_G} G_{l,i}\alpha_i \sum_{j=1}^{N_W} w_j^t + \sum_{k=1}^{N_D} G_{l,k} d_k^t \geq q_{l,t}^{up} \quad (46)$$

$$-L_l - \sum_{i=1}^{N_G} G_{l,i} P_i^t - \sum_{i=1}^{N_G} G_{l,i}\alpha_i \sum_{j=1}^{N_W} w_j^t + \sum_{k=1}^{N_D} G_{l,k} d_k^t \leq q_{l,t}^{up} \quad (47)$$

$$ACDF_{\xi_l^t}(q_{l,t}^{up}) - ACDF_{\xi_l^t}(q_{l,t}^{dn}) \geq 1 - \beta \quad (48)$$

where, $q_{l,t}^{up}$ and $q_{l,t}^{dn}$ are auxiliary variables, which respectively represent a upper and lower quantiles of the power flow constraint of the $l^{th}$ branch at time t;

(4) solving the two-side stochastic dispatching model based on hyperbolic tangent function approximation, in which, the interior point method is used to solve the optimization model including the objective function (1)-(2) and constraints (3)-(9), (14), (19)-(24) in the above steps (1)-(3), to obtain the planned power $P_i^t$ of the $i^{th}$ thermal power unit during the dispatching period t and the planned reference power $w_j^t$ of the $j^{th}$ renewable energy power station during the dispatching period t, in which $P_i^t$ is regarded as the planned power of the $i^{th}$ thermal power unit during the dispatching period t and $w_j^t$ is regarded as the reference power of the $j^{th}$ renewable energy power station during the dispatching period t, to realize the chance-constrained stochastic economic dispatching based on the approximation of the hyperbolic tangent function.

What is claimed is:

1. A two-side stochastic dispatching method for a power grid, comprising:
   (1) establishing, by the power grid, a two-side stochastic dispatching model based on a hyperbolic tangent function approximation, wherein the two-side stochastic dispatching model comprises an objective function and constraints;
   (2) analyzing and approximating, by the power grid, a Gaussian mixture distribution of a random variable appearing in the constraints, based on a reserve demand constraint and a power flow constraint of the constraints in step (1), to obtain an approximate expression of the random variable;
   (3) transforming, by the power grid, the two-side stochastic dispatching model in step (1) into a deterministic optimization model based on the approximation of the random variable in the reserve demand constraint and the power flow constraint in step (2);
   (4) using, by the power grid, an interior point method to solve the deterministic optimization model transformed in steps (1) to (3), to obtain a power generation plan of thermal power units and renewable energy power stations of the power grid; and
   operating, by the power grid, the thermal power units and the renewable energy power stations based on the power generation plan.

2. The method according to claim 1, wherein the step (1) comprises:
   (1) the establishing the objective function of the two-side stochastic dispatching model, comprising:

minimizing a sum of a power generation cost, a positive spinning reserve capacity cost and a negative spinning reserve capacity cost, of the thermal power units, which is expressed by a formula of:

$$\min \sum_{t=1}^{T}\sum_{i=1}^{N_G} CF_i(P_i^t) + \sum_{t=1}^{T}\sum_{i=1}^{N_G}\left(c_{up}r_{i,t}^{up} + c_{dn}r_{i,t}^{dn}\right) \quad (1)$$

where, T represents a number of dispatching periods,
$N_G$ represents a number of the thermal power units,
t represents a serial number of the dispatching period,
i represents a serial number of the thermal power unit,
$c_{up}$ represents a positive spinning reserve capacity cost per unit,
$c_{dn}$ represents a negative spinning reserve capacity cost per unit,
$r_{i,t}^{up}$ represents a positive spinning reserve capacity reserved by an $i^{th}$ thermal power unit during a dispatching period t,
$r_{i,t}^{dn}$ represents a negative spinning reserve capacity reserved by the $i^{th}$ thermal power unit during the dispatching period t,
$P_i^t$ represents a planned power of the $i^{th}$ thermal power unit during the dispatching period t,
$CF_i$ represents a fuel cost function of the $i^{th}$ thermal power unit,
wherein the fuel cost function of the thermal power unit is expressed as a quadratic function of the power $P_i^t$ of the thermal power unit by a formula of:

$$CF_i(P_i^t) = a_i(P_i^t)^2 + b_i P_i^t + c_i \quad (2)$$

where, $a_i$ represents a quadratic coefficient of a fuel cost of the $i^{th}$ thermal power unit,
$b_i$ represents a primary coefficient of the fuel cost of the $i^{th}$ thermal power unit,
$c_i$ represents a constant coefficient of the fuel cost of the $i^{th}$ thermal power unit,
(2) the constraints of the two-side stochastic dispatching model, comprising:
(2-1) a power balance constraint of the power grid, which is expressed by a formula of:

$$\sum_{i=1}^{N_G} P_i^t + \sum_{j=1}^{N_W} w_j^t = \sum_{k=1}^{N_D} d_k^t \quad (3)$$

where, $w_j^t$ represents a planned reference power of a $j^{th}$ renewable energy power station during the dispatching period t,
$d_k^t$ represents a size of a $k^{th}$ load during the dispatching period t,
$N_w$ represents a number of the power stations, and
$N_D$ represents a number of loads;
(2-2) an upper limit constraint and a lower limit constraint of the power $P_i^t$ of the thermal power unit in the power grid, which is expressed by a formula of:

$$\underline{P}_i \leq P_i^t \leq \overline{P}_i \quad (4)$$

where, $\underline{P}_i$ represents an upper bound of the power of the $i^{th}$ thermal power unit, and
$\overline{P}_i$ represents a lower bound of the power of the $i^{th}$ thermal power unit;

(2-3) an upper limit constraint and a lower limit constraint of the planned power $w_j^t$ of the power station of the power grid, which is expressed by a formula of:

$$0 \leq w_j^t \leq \overline{w}_j^t \quad (5)$$

where, $\overline{w}_j^t$ represents an upper bound of an allowable power of the $j^{th}$ renewable energy power station during the dispatching period t;
(2-4) ramp constraints of the thermal power unit in the power grid, which are expressed by formulas of:

$$P_i^t - P_i^{t-1} \geq -RD_i \Delta T \quad (6) \text{ and}$$

$$P_i^t - P_i^{t-1} \leq RU_i \Delta T \quad (31)$$

where, $RU_i$ represents an upward ramp rate of the $i^{th}$ thermal power unit,
$RD_i$ represents a downward ramp rate of the $i^{th}$ thermal power unit,
$\Delta T$ represents a dispatching interval between two adjacent dispatching periods;
(2-5) a maximum reserve capacity constraint that the thermal power unit in the power grid provides, which is expressed by formulas of:

$$r_{i,t}^{up} \leq \min\{\overline{P}_i - P_i^t, RU_i \Delta T\} \quad (8) \text{ and}$$

$$r_{i,t}^{dn} \leq \min\{P_i^t - \underline{P}_i, RD_i \Delta T\} \quad (9)$$

where, a mathematical symbol min {·} represents a minimum value of elements in a set;
(2-6) the reserve demand constraint in response to fluctuations in the renewable energy power stations in the power grid, which is expressed by a formula of:

$$Pr\left(-\sum_{i=1}^{N_G} r_{i,t}^{up} \leq \sum_{j=1}^{N_W} \tilde{w}_j^t - \sum_{j=1}^{N_W} w_j^t \leq \sum_{i=1}^{N_G} r_{i,t}^{dn}\right) \geq 1 - \beta \quad (10)$$

where, a mathematical symbol Pr {·} represents a probability of occurrence of an event,
$\tilde{w}_j^t$ represents an actual power of the $j^{th}$ renewable energy power station during the dispatching period t,
a superscript ~ represents that a variable is a random variable,
$\beta$ represents a maximum risk level preset by a dispatcher and a value range of the maximum risk level is 0 to 0.5, a joint probability distribution of the actual power of all of the renewable energy power stations meets a Gaussian mixture distribution of:

$$\tilde{w}^t = \{\tilde{w}_j^t \mid 1 \leq j \leq N_W\} \text{ and} \quad (11)$$

$$PDF_{\tilde{w}^t}(Y) = \sum_{m=1}^{M} \omega_m N\left(Y, \mu_m, \sum\nolimits_m\right), \omega_m \geq 0 \quad (12)$$

$$N\left(Y \mid \mu_m, \sum\nolimits_m\right) = \frac{1}{(2\pi)^{N_W/2} \det(\sum_m)^{1/2}} e^{-\frac{1}{2}(Y-\mu_m)^T \sum_m^{-1}(Y-\mu_m)}$$

$\tilde{w}^t$ represents a planned power set of all of the renewable energy power stations during the dispatching period t,
$\tilde{w}^t$ is a stochastic vector,
$PDF_{\tilde{w}^t}(\cdot)$ represents a probability density function of the stochastic vector, Y represents a value of $\tilde{w}^t$, $N(Y, \mu_m, \Sigma_m)$ represents a $m^{th}$ component of the Gaussian mixture distribution, M represents a number of components of the Gaussian mixture distribution, $\omega_m$, represents a weight coefficient of the $m^{th}$ component of the Gaussian mixture distribution and satisfies that a sum of weight coefficients of all components is equal to 1, $\mu_m$, represents a mean vector of the $m^{th}$ component, $\Sigma_m$ represents a covariance matrix of the $m^{th}$ component, det represents a determinant of the matrix, and a superscript T represents a transpose of the matrix;

(2-7) the power flow constraint of the power grid, which is expressed by a formula of:

$$Pr\left(-L_l \leq \sum_{i=1}^{N_G} G_{l,i}\tilde{P}_i^t + \sum_{j=1}^{N_W} G_{l,j}\tilde{w}_j^t - \sum_{k=1}^{N_D} G_{l,k}d_k^t \leq L_l\right) \geq 1 - \eta, \quad (13)$$

where, $G_{l,i}$ represents a transfer distribution factor of a $l^{th}$ branch for an active power of the $i^{th}$ thermal power unit, $G_{l,j}$ represents a transfer distribution factor of the $l^{th}$ branch for an active power of the $j^{th}$ renewable energy power station, $G_{l,k}$ represents a transfer distribution factor of the $l^{th}$ branch for the $k^{th}$ load, the above-mentioned transfer distribution factors are respectively obtained from a power grid dispatching center, $L_l$ represents an upper limit of active power on the $l^{th}$ branch, $\eta$ represents a risk level that the active power on the branch exceeds the upper limit of active power on the branch, which is set by the dispatcher, $\tilde{P}_i^t$ represents an actual power of the $i^{th}$ thermal power unit during the dispatching period t, which is expressed by a formula of:

$$\tilde{P}_i^t = P_i^t - \alpha_i\left(\sum_{j=1}^{N_W}\tilde{w}_j^t - \sum_{j=1}^{N_W}w_j^t\right) \quad (14)$$

$$\sum_{i=1}^{N_G} \alpha_i = 1$$

where, $\alpha_i$ represents a power distribution coefficient of the $i^{th}$ thermal power unit, which is determined by a ratio of a rated capacity of the thermal power unit to a total capacity of all thermal power units participating in power generation;

in order to meet the power balance of the power grid at any dispatch time, a sum of power distribution coefficients of all thermal power units is equal to 1, $$\sum_{j=1}^{N_W}\tilde{w}_j^t - \sum_{j=1}^{N_W}w_j^t$$

represents a power difference between actual powers and planned powers of all of the renewable energy power stations;

substituting the formula (14) into the formula (13), wherein the formula (13) is transformed into a formula of:

$$Pr\left(-L_l \leq \sum_{i=1}^{N_G} G_{l,i}P_i^t + \sum_{i=1}^{N_G} G_{l,i}\alpha_i \sum_{j=1}^{N_W} w_j^t + \sum_{j=1}^{N_W}\left(G_{l,j} - \sum_{i=1}^{N_G} G_{l,i}\alpha_i\right)\tilde{w}_j^t - \sum_{k=1}^{N_D} G_{l,k}d_k^t \leq L_l\right) \geq 1 - \eta. \quad (15)$$

3. The method according to claim 1, wherein the step (2) comprises:

(1) approximating the Gaussian mixture distribution by a formula of:

$$CDF_{\xi_0}(x) \approx \sum_{m_0}^{M_0} \frac{\omega_0}{2}\left(1 + \tanh\left(a\frac{x-\mu_{m_0}}{\sigma_{m_0}} + b\left(\frac{x-\mu_{m_0}}{\sigma_{m_0}}\right)^3\right)\right) \quad (16)$$

$a = 0.7983, b = 0.03564$ $$\sum_{m_0}^{M_0} \omega_0 = 1$$

where, $\xi_0$ represents any one-dimensional random variable that obeys the Gaussian mixture distribution, $CDF_{\xi_0}$ represents a cumulative distribution function of the random variable, x represents an independent variable of the cumulative distribution function and represents a possible value of $\xi_0$, $M_0$ represents a number of Gaussian components obeyed by the random variable $\xi_0$, $m_0$ represents a $m_0^{th}$ component, $\omega_0, \mu_{m_0}, \sigma_{m_0}$ represent a weight coefficient, an expectation and a standard deviation of the $m_0^{th}$ component, a and b represent constants, and tanh represent a hyperbolic tangent function in mathematical operations;

(2) based on the approximating method of the Gaussian mixture distribution in step (1), approximating the cumulative distribution function of the random variable in the reserve demand constraint in the formula (13) by a formula of:

$$CDF_{\xi_r^t}(y) \approx ACDF_{\xi_r^t}(y) = \sum_m^M \frac{\omega_m}{2}\left(1 + \tanh\left(a\frac{y - 1^T\mu_m}{1^T\Sigma_m 1} + b\left(\frac{y - 1^T\mu_m}{1^T\Sigma_m 1}\right)^3\right)\right) \quad (17)$$

$\xi_r^t = 1^T \tilde{w}_j^t$, where $\xi_r^t$ represents a random variable and represents a sum of actual powers of all of the renewable energy power stations at time t, 1 represents a column vector with all elements being 1, $CDF_{\xi_r^t}(\cdot)$ represents a probability density function of the one-dimensional random variable $\xi_r^t$, y represents an independent variable of the cumulative distribution function $\text{CDF}_{\xi_r^t}(\cdot)$ and represents a possible value of $\xi_r^t$, and $\text{ACDF}_{\xi_r^t}(\cdot)$ represents an approximate expression of $\text{CDF}_{\xi_r^t}(\cdot)$; and (3) based on the approximating method of the Gaussian mixture distribution in step (1), approximating the cumulative distribution function of the random variable in the power flow constraint of the power grid in the formula (15) by a formula of:

$$CDF_{\xi_l^t}(z) \approx ACDF_{\xi_l^t}(z) = \sum_m^M \frac{\omega_m}{2}\left(1 + \tanh\left(a\frac{z - F_l^T\mu_m}{F_l^T\sum_m F_l} + b\left(\frac{z - F_l^T\mu_m}{F_l^T\sum_m F_l}\right)^3\right)\right) \quad (18)$$

$$\xi_l^t = F_l^T \tilde{w}_j$$

where, $F_l$ represents a column vector and a $j^{th}$ element of the vector is $$G_{l,j} - \sum_{i=1}^{N_G} G_{l,i}\alpha_i,$$

$\xi_l^t$ represents a random variable and represents a linear combination of actual powers of all of the renewable energy power stations at time t, coefficients of the linear combination is $F_l$, $\text{CDF}_{\xi_l^t}(\cdot)$ represents a probability density function of the one-dimensional random variable $\xi_l^t$, z represents an independent variable of the cumulative distribution function $\text{CDF}_{\xi_l^t}(\cdot)$ and represents a possible value of $\xi_l^t$, and $\text{ACDF}_{\xi_l^t}(\cdot)$ represents an approximate expression of $\text{CDF}_{\xi_l^t}(\cdot)$.

4. The method according to claim 1, wherein the step (4) comprises:

(1) transforming a chance constraint by using the formula (17) of the cumulative distribution function based on the approximation of the random variable in the reserve demand constraint, as formulas of:

$$\sum_{i=1}^{N_G} r_{i,t}^{dn} + \sum_{j=1}^{N_W} w_j^t \geq q_{r,t}^{up} \quad (19)$$

$$-\sum_{i=1}^{N_G} r_{i,t}^{dn} + \sum_{j=1}^{N_W} w_j^t \leq q_{r,t}^{up} \quad (20)$$

$$ACDF_{\xi_r^t}(q_{r,t}^{up}) - ACDF_{\xi_r^t}(q_{r,t}^{dn}) \geq 1 - \beta \quad (21)$$

where, $q_{r,t}^{up}$ and $q_{r,t}^{dn}$ are auxiliary variables, which respectively represent a upper and lower quantiles of the reserve demand constraint at time t;

(2) transforming a power flow chance constraint determined in the formula (15) by using the formula (18) of the cumulative distribution function of the random variable in the power flow constraint of the power grid based on the approximation of the random variable in the power flow constraint of the power grid, as formulas of:

$$L_l - \sum_{i=1}^{N_G} G_{l,i}P_i^t - \sum_{i=1}^{N_G} G_{l,i}\alpha_i \sum_{j=1}^{N_W} w_j^t + \sum_{k=1}^{N_D} G_{l,k}d_k^t \geq q_{l,t}^{up} \quad (22)$$

$$-L_l - \sum_{i=1}^{N_G} G_{l,i}P_i^t - \sum_{i=1}^{N_G} G_{l,i}\alpha_i \sum_{j=1}^{N_W} w_j^t + \sum_{k=1}^{N_D} G_{l,k}d_k^t \leq q_{l,t}^{up} \quad (23)$$

$$ACDF_{\xi_l^t}(q_{l,t}^{up}) - ACDF_{\xi_l^t}(q_{l,t}^{dn}) \geq 1 - \beta \quad (24)$$

where, $q_{l,t}^{up}$ and $q_{l,t}^{dn}$ are auxiliary variables, which respectively represent a upper and lower quantiles of the power flow constraint of the $l^{th}$ branch at time t;

(4) solving the two-side stochastic dispatching model based on the hyperbolic tangent function approximation, wherein, the interior point method is used to solve the optimization model including the objective function (1)-(2) and constraints (3)-(9), (14), (19)-(24) in the above steps (1)-(3), to obtain the planned power $P_i^t$ of the $i^{th}$ thermal power unit during the dispatching period t and the planned reference power $w_j^t$ of the $j^{th}$ renewable energy power station during the dispatching period t, in which $P_i^t$ is regarded as the planned power of the $i^{th}$ thermal power unit during the dispatching period t and $w_j^t$ is regarded as the reference power of the $j^{th}$ renewable energy power station during the dispatching period t, to realize a chance-constrained stochastic economic dispatching based on the approximation of the hyperbolic tangent function.

* * * * *